(12) United States Patent
Pantazi et al.

(10) Patent No.: US 10,347,282 B2
(45) Date of Patent: Jul. 9, 2019

(54) TAPE TRANSPORT CONTROL WITH SUPPRESSION OF TIME-VARYING TENSION DISTURBANCES

(71) Applicant: International Business Machines Corporation, Armonk, NY (US)

(72) Inventors: Angeliki Pantazi, Thalwil (CH); Giovanni Cherubini, Rueschlikon (CH); Tomoko Taketomi, Yamato (JP); Nhan X. Bui, Tucson, AZ (US); Mark A. Lantz, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 15/631,033

(22) Filed: Jun. 23, 2017

(65) Prior Publication Data

US 2018/0374508 A1    Dec. 27, 2018

(51) Int. Cl.
| | | |
|---|---|---|
| *G11B 5/09* | (2006.01) | |
| *G11B 15/43* | (2006.01) | |
| *G11B 15/48* | (2006.01) | |

(52) U.S. Cl.
CPC .............. *G11B 15/43* (2013.01); *G11B 15/48* (2013.01); *G11B 2220/90* (2013.01)

(58) Field of Classification Search
None
See application file for complete search history.

(56) References Cited

U.S. PATENT DOCUMENTS

| 4,133,494 | A | * | 1/1979 | Nukui | .................... | G11B 15/28 |
|---|---|---|---|---|---|---|
| | | | | | | 242/334.2 |
| 4,218,639 | A | * | 8/1980 | Sanguu | .................. | G11B 15/43 |
| | | | | | | 318/493 |
| 4,459,626 | A | * | 7/1984 | Branger | ................. | G11B 15/62 |
| | | | | | | 360/130.22 |

(Continued)

FOREIGN PATENT DOCUMENTS

WO    2016067051 A1    5/2016

OTHER PUBLICATIONS

Cherubini et al., "Near-optimal tape transport control with feedback of velocity and tension", 7th IFAC (International Federation of Automatic Control) Symposium on Mechatronics Systems, IFAC-PapersOnLine 49-21 (2016) 019-025, 7 pages.

(Continued)

*Primary Examiner* — Peter Vincent Agustin
(74) *Attorney, Agent, or Firm* — Monchai Chuaychoo

(57) ABSTRACT

Embodiments of the present invention provide a tape transport control system with enhanced regulation of tape tension and velocity over the entire length of the tape. The tape transport control system comprises of circuitry adapted to output and circuitry adapted to receive one or more signals representing a tape velocity, at least one radius of either the first tape reel or the second tape reel, and a tape tension, and based on the received signals, generate at least one control signal to control at least one of the first reel motor or the second reel motor so as to reduce a tension disturbance at a minimum, one frequency corresponding to a time-varying reel-rotation frequency, based on controller parameters that depend on the tape velocity and on the at least one radius of either the first tape reel or the second tape reel.

15 Claims, 13 Drawing Sheets

(56) References Cited

U.S. PATENT DOCUMENTS

| | | | | |
|---|---|---|---|---|
| 4,511,943 | A * | 4/1985 | Fechner | G11B 15/61 360/130.23 |
| 4,525,654 | A * | 6/1985 | Tajima | G11B 15/43 242/334.3 |
| 4,531,166 | A * | 7/1985 | Anderson | G11B 5/09 242/334.4 |
| 5,039,027 | A * | 8/1991 | Yanagihara | G11B 15/43 242/334.2 |
| 5,259,563 | A * | 11/1993 | Kakiwaki | B65H 59/384 242/334.3 |
| 5,330,118 | A * | 7/1994 | Yoshikawa | G11B 15/43 242/334.4 |
| 5,465,918 | A * | 11/1995 | Watanabe | G11B 15/43 242/334.2 |
| 5,540,398 | A * | 7/1996 | Nishida | G11B 15/43 242/334.2 |
| 5,808,824 | A * | 9/1998 | Kaniwa | G11B 15/43 242/334 |
| 6,563,659 | B1 * | 5/2003 | Fasen | G11B 15/087 242/334.6 |
| 8,079,539 | B2 | 12/2011 | Huang et al. | |
| 8,317,421 | B2 | 11/2012 | McNestry | |
| 8,982,500 | B1 | 3/2015 | Cherubini et al. | |
| 2016/0125909 | A1 * | 5/2016 | Fasen | G11B 15/46 360/73.08 |

OTHER PUBLICATIONS

Cherubini et al., "Identification of MIMO Transport Systems in Tape Drives", 2013 IEEE/ASME International Conference on Advanced Intelligent Mechatronics (AIM) Wollongong, Australia, Jul. 9-12, 2013, 6 pages.

Cherubini et al., "Tape Transport Control With Feedback of Velocity and Tension", IBM U.S. Appl. No. 15/244,508, filed Aug. 23, 2016, 29 pages.

Pantazi et al., "Tape transport control based on sensor fusion". Preprints of the 19th World Congress The International Federation of Automatic Control, Cape Town, South Africa. Aug. 24-29, 2014, 6849-6855.

Zhong et al., "Regulating Web Tension in Tape Systems with Time-varying Radii", 2009 American Control Conference, St. Louis, MO, USA, Jun. 10-12, 2009, 978-1-4244-4524-0/09, © 2009 AACC, 6 pages.

Zhong et al., "Disturbance Rejection in Parameter-varying Web-winding Systems", Proceedings of the 17th World Congress, The International Federation of Automatic Control Seoul, Korea, Jul. 6-11, 2008, 6 pages.

* cited by examiner

TAPE TRANSPORT CONTROL WITH SUPPRESSION OF TIME-VARYING TENSION DISTURBANCES

BACKGROUND OF INVENTION

The present invention relates to techniques for controlling a tape transport and more specifically, with enhanced regulation of tape tension while suppressing time-varying or periodic tension disturbances.

Tape systems can provide cost effective storage solutions, which are becoming increasingly important as the world faces an explosive growth in the rate of data creation. In recent years, the capacity and performance of tape storage systems have increased considerably, and the potential for further growth appears to be substantial. To achieve higher tape cartridge capacities and improved performance, advances in several technical areas are necessary. For example, areal density increase, i.e., increase in linear and/or track density, is an essential requirement for achieving higher capacities. However, higher track density implies narrower track width, narrower write/read head elements, and closer tape-to-head spacing, leading to losses in signal-to-noise ratio and stringent requirements on the precision of the write/read head elements.

Deviations of tape tension and velocity from the target values may adversely affect the position error signal and hence the performance of a track following servo. Robust tape transport and track-following servomechanisms are therefore necessary to provide good read-channel performance on all parallel data channels during tape operation. Moreover, moving to thinner tape media, which leads to higher volumetric density, represents a further avenue for achieving higher capacities of tape cartridges. Hence, a need arises for the tape transport servomechanism to provide tighter control of tension, to prevent tension variations that might overstress the thin media.

A further problem may arise while operating in the steady-state velocity mode, in that periodic variations of tape tension around the nominal value, also called wrap-arounds, may occur. Such variations may be induced by the reel eccentricities. In tape transport, this problem may be particularly serious when the reel rotation frequencies approach the resonance frequency determined by the tape path. Although the adverse effects of tension variations are well acknowledged and understood, no effective conventional method has been developed for the suppression of these periodic tension disturbances with slowly time-varying frequency. Recent work on tape transport control with feedback of velocity and tension has focused on the choice of time-varying p-type controllers to achieve a closed-loop system behavior that is essentially independent of the tape longitudinal position. However, a p-type controller does not provide enhanced rejection of disturbances due to periodic tension variations.

Accordingly, a need arises for techniques by which a tape transport control system may provide enhanced regulation of tape tension while suppressing time-varying or periodic tension disturbances.

SUMMARY

According to an embodiment of the present invention, a closed-loop control system for controlling a tape transport from a first tape reel having a first reel motor to a second tape reel having a second reel motor in a tape drive system, comprising: circuitry adapted to output one or more signals representing a tape velocity, at least one radius of either the first tape reel or the second tape reel, and a tape tension; and control circuitry adapted to receive the one or more signals representing the tape velocity, the at least one radius of either the first tape reel or the second tape reel, and the tape tension, and based on the received signals, generate at least one control signal to control at least one of the first reel motor or the second reel motor so as to reduce a tension disturbance at a minimum, one frequency corresponding to a time-varying reel-rotation frequency, based on controller parameters that depend on the tape velocity and on the at least one radius of either the first tape reel or the second tape reel.

According to another embodiment of the present invention, a tape transport system, comprising: a first tape reel having a first reel motor, a second tape reel having a second reel motor, and a tape head; circuitry adapted to output one or more signals representing a tape velocity, at least one radius of either the first tape reel or the second tape reel, and a tape tension; and control circuitry adapted to receive the one or more signals representing the tape velocity, the at least one radius of either the first tape reel or the second tape reel, and the tape tension, and based on the received signals, generate at least one control signal to control at least one of the first reel motor or the second reel motor so as to reduce a tension disturbance at a minimum, one frequency corresponding to a time-varying reel-rotation frequency, based on controller parameters that depend on the tape velocity and on the at least one radius of either the first tape reel or the second tape reel.

According to another embodiment of the present invention, a method for tape transport comprising: generating one or more signals representing a tape velocity, at least one radius of either a first tape reel or a second tape reel, and a tape tension; receiving the one or more signals representing the tape velocity, the at least one radius of either the first tape reel or the second tape reel, and the tape tension; and based on the received signals, generating at least one control signal to control at least one of the first reel motor or the second reel motor so as to reduce a tension disturbance at a minimum, one frequency corresponding to a time-varying reel-rotation frequency, based on controller parameters that depend on the tape velocity and on the at least one radius of either the first tape reel or the second tape reel.

DETAILED DESCRIPTION

Embodiments of the present invention provides an improvement to a tape transport control scheme with feedback of tension using p-type controllers augmented with a time-varying peak filter. A peak-filter with variable center frequency can suppress periodic disturbances with slowly time-varying frequency, such as those that are originated by the wrap arounds. To avoid the disturbance, enhancement that would occur when the disturbance frequency moves outside of the loop bandwidth and the parameters that determine the zeros of the peak filter may be determined by $H_\infty$-norm (H-infinity norm) minimization. The method may be extended to allow feedback of tension without requiring additional transducers in the tape path for tension measurement. Consequently, the tension may be estimated by expressing the tension deviation from the nominal value as a function of the difference of the lateral position estimates that are obtained by reading servo patterns written on adjacent servo bands. However, this methodology provides an estimate of the dynamic tension variation, but does not allow compensation for tension variations at very low frequencies close to dc, because of the very slowly varying deviation of the distance between servo bands from the nominal value due to creep and tape-pack stress that may take place during the winding of tape. To obviate this phenomenon, a high-pass section may be included in the transfer function of the controller, and feed forward time-varying filters may be included to adjust the dc tension value.

Improving the tape transport performance is advantageous for achieving larger volumetric densities, as it allows adoption of thinner tape media. In the embodiment of the present invention, a tape transport servomechanism may adapt its frequency characteristics depending on the longitudinal position. An $H_\infty$-optimized time-varying peak filter may enhance the disturbance rejection at the reel rotation frequencies. The present invention can provide disturbance rejection even at frequencies outside the loop bandwidth with minimal disturbance amplification. A measurement of tension variation based on the difference of lateral position estimates may be introduced in the control system, thus completely avoiding the need for a tension sensor. The controller may be augmented with a high-pass filter to avoid low frequency effects due to creep. The present invention can compensate for reel-related disturbances and may improve the tape transport performance.

Figure 1:
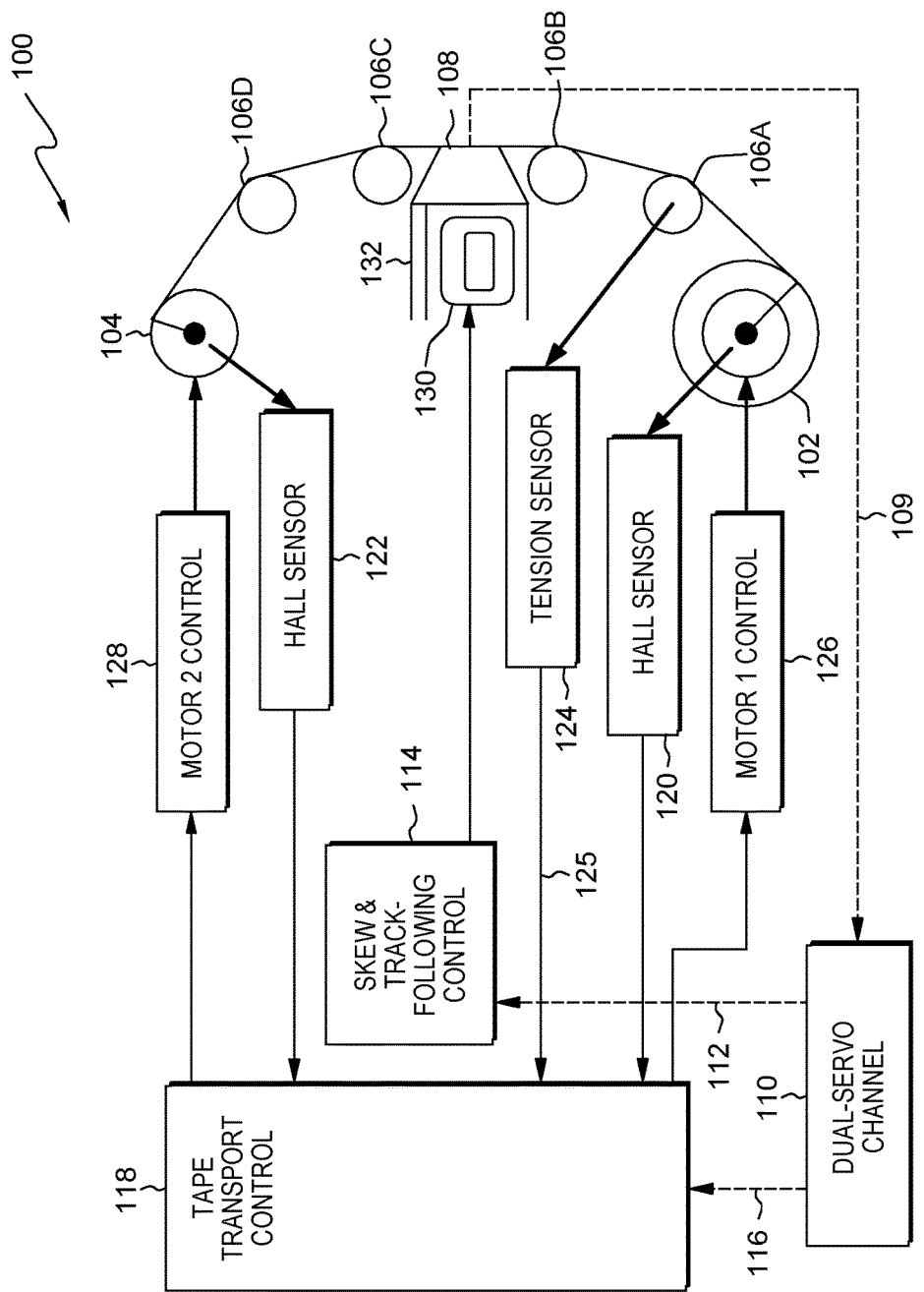
FIG. 1 is an exemplary block diagram of a tape transport mechanism and track-following control systems.

A block diagram of an exemplary tape transport mechanism and track-following control systems in a tape drive is shown in FIG. 1. For motion in the forward direction, the tape may be transported from a file (or outboard or number 1) reel 102, acting as a supply reel, to the machine (or inboard or number 2) reel 104, acting as a take-up reel, through the tape path consisting of rollers 106A-D and the read/write tape head 108. In the reverse direction, the roles of the reel 1 102 and reel 2 104 may be reversed. Read/write operations may be performed in contact with the tape by the read/write elements 130 that may be included in the tape head and provide signals 109 for the servo and data channels. Tape head 108 may further include an actuator 132 to adjust the rotational and lateral position of the head in response to skew and track-following controller 114. A dual synchronous servo channel may provide estimates of the primary tape velocity, tape longitudinal position (LPOS), and head lateral position, which may be derived from servo signals that are generated by the two servo readers in the tape head 108. The servo readers may read signals from servo tracks or other servo recorded areas on the tape, or the servo readers may read the data signals, and the servo channel circuitry may derive servo signals therefrom. An estimate of the tape tension 125 may be obtained by one or more tension sensors 124, such as a strain-gauge sensor that is positioned within one of the rollers 106A-D, such as roller 106A, in the tape path.

Estimates of tape velocity and head position 112 may be provided to a skew and track-following controller 114 Likewise, estimates of tape velocity, head position, and LPOS 116 may be supplied to the tape transport control system 118. Tape transport control system 118 may process the received tape velocity, head position, and LPOS 116 and generate control signals output to motor control circuitry, such as motor 1 control 126 and motor 2 control 128. Hall-effect sensors 120, 122 may provide measures of the rotation rate of each reel 102, 104 and may be used to obtain additional secondary tape velocity information from the individual reels. The secondary tape velocity information may be used to achieve proper tape transport operation in the absence of valid parameter estimates from the dual servo channel 110, for example during tape acceleration, or to enhance tape transport performance. The two servo readers in the tape head 108 may read two dedicated servo bands that may straddle a data band. The servo-pattern geometry may be specified by the Timing-Based Servo (TBS) format for linear tape systems that has been adopted by the Linear Tape Open (LTO) consortium as a standard for tape drive systems. These dedicated servo signals may be viewed as pilot signals to yield precise longitudinal, as well as lateral, position information to be provided to the tape transport and track-following servomechanisms. A dual synchronous servo channel may provide estimate of the primary tape velocity, the tape longitudinal position (LPOS), and the head lateral position. An estimate of the tape tension may be obtained by a strain-gauge sensor that is positioned within one of the rollers in the tape path. However, embodiments of the present systems and methods may determine an estimate of tension variation without the need for tension transducers.

System 100 may be modeled mathematically using second-order differential equations, which may be obtained by equating the change in angular momentum to the sum of torques for each reel. The state-space equations of the linear time-varying tape transport system at a certain longitudinal tape position and tape velocity in the forward direction may be given by $\dot{x}(t)=Fx(t)+Gu(t)$, where the state vector x for system 100 is:

$$x(t) = \begin{bmatrix} x_1(t) \\ \dot{x}_1(t) \\ x_2(t) \\ \dot{x}_2(t) \end{bmatrix} = \begin{bmatrix} \text{tape position at machine reel}(i) \\ \text{tape velocity at machine reel}(i) \\ \text{tape position at file reel}(o) \\ \text{tape velocity at file reel}(o) \end{bmatrix},$$

the vector of control signals may be $$u(t) = \begin{bmatrix} u_i(t) \\ u_0(t) \end{bmatrix}, \text{ and the matrices } F \text{ and } G \text{ may be given by}$$

$$F = \begin{bmatrix} 0 & 1 & 0 & 0 \\ \frac{-(1+\mu)R_i^2 K_T}{J_i} & \frac{-(1+\mu)R_i^2 D_T - \beta_i}{J_i} & \frac{(1+\mu)R_i^2 K_T}{J_i} & \frac{(1+\mu)R_i^2 D_T}{J_i} \\ 0 & 0 & 0 & 1 \\ \frac{R_0^2}{J_0} & \frac{R_0^2 D_T}{J_0} & -\frac{R_0^2 K_T}{J_0} & \frac{R_0^2 D_T - \beta_0}{J_0} \end{bmatrix}$$

$$G + \begin{bmatrix} 0 & 0 \\ \frac{R_i K_i}{J_i} & 0 \\ 0 & 0 \\ 0 & \frac{R_0 K_0}{J_0} \end{bmatrix}.$$

A number of parameters may be utilized in analyzing performance of the system. For example, ρ may be the tape density [Kg/m³], ε may be the tape thickness [m], η may be the tape width [m], $R_o$ may be the radius of empty reel [m], $R_f$ may be the radius of full reel [m], $K_1$, $K_2$ may be the motor driver gains [N m/A], $K_T$ may be the tape spring constant [N/m], $D_T$ may be the tape damper coefficient [N s/m], $\beta_i$, $\beta_O$ may be the motor viscous damping coefficients [N m s], μ may be the Coulomb friction coefficient, $R_i$ and $R_O$ may be the radii, and $J_i$ and $J_O$ may be the moments of inertia of reel 1 and reel 2, respectively.

The dynamics of the tape velocity at the supply reel and at the head may be approximately the same, and may differ from the dynamics of the tape velocity at the take-up reel. The vector y of the tape transport output signals may include the primary tape velocity and the tape tension, and may be expressed in terms of the state vector as $$y(t) = \begin{bmatrix} \hat{v}(t) \\ \hat{\tau}(t) \end{bmatrix} = Hx(t) + w(t),$$

where $$H = \begin{bmatrix} 0 & 0 & 0 & 1 \\ K_T & D_T & -K_T & -D_T \end{bmatrix},$$

and where $\hat{v}(t)$ denotes the primary tape velocity, which is approximately equal to the secondary tape velocity at the file reel in forward direction, as mentioned above, $\hat{\tau}(t)$ is the tape tension, and w(t) denotes the measurement noise vector.

Figure 2A:
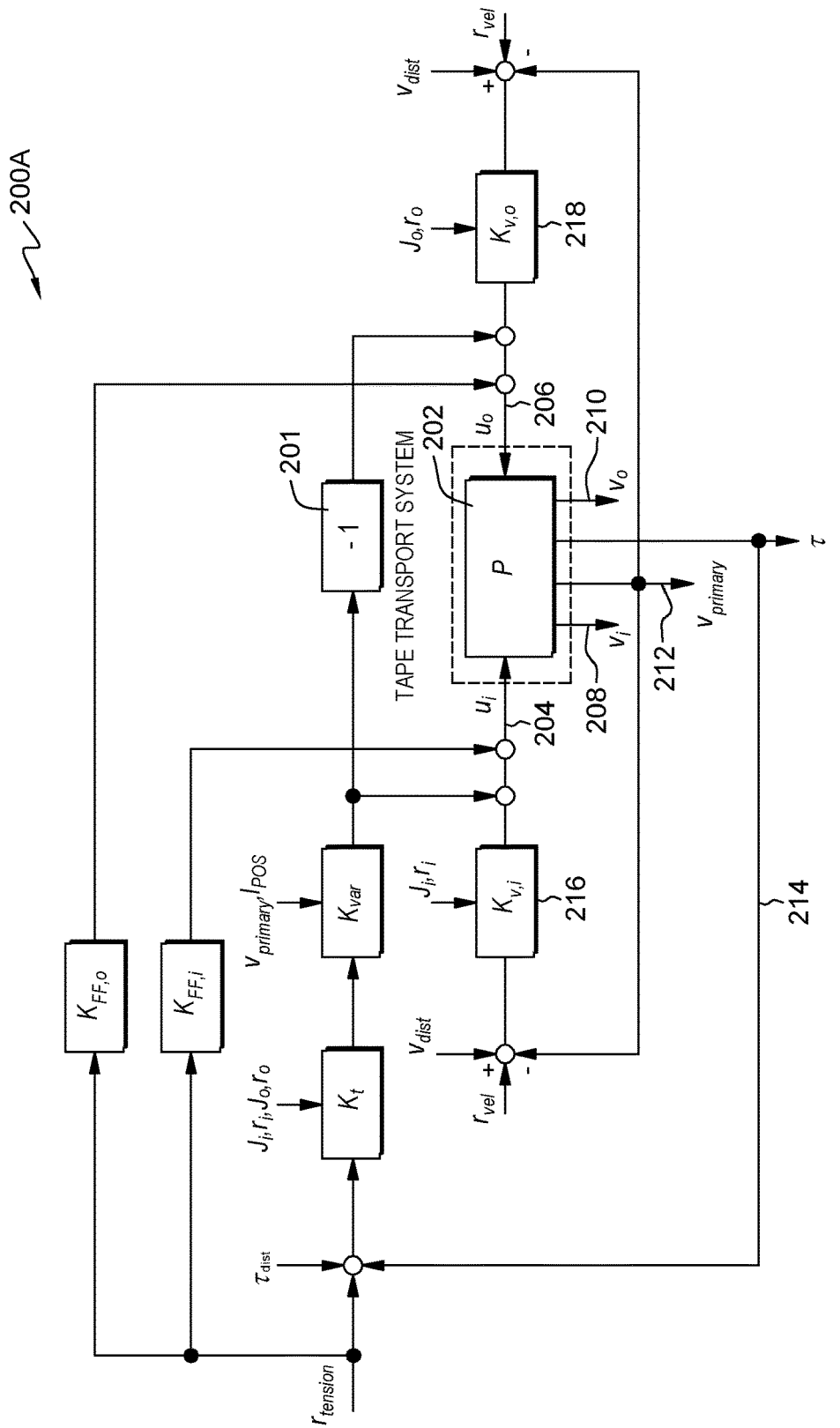
FIG. 2A is an exemplary block diagram of a tape transport control system with feedback of primary velocity and tension.

An exemplary block diagram of a tape transport control system 200A with feedback of primary velocity and tension is shown in FIG. 2A. Tape transport system 202 may include inputs, such as control signals $u_i$ 204 for reel 1 and $u_o$ 206 for reel 2. Tape transport system 202 may also include outputs, such as $v_i$ 208 for the velocity of reel 1 from Hall sensor 102, shown in FIG. 1, $v_o$ 210 for the velocity of reel 2 from Hall sensor 102, $v_{primary}$ 212 for the primary tape velocity from servo signals that are generated by two servo readers in the tape head 108, and tape tension τ 214 from a strain-gauge sensor that is mounted on one of the rollers in the tape path.

System 200A may also include feedback of tape tension as well. In particular, time-varying proportional (p-type) controllers may be used for the control of tension, tape velocity at the supply reel, and tape velocity at the take-up reel. For example, p-type controllers $K_{v,i}$ 216 and $K_{v,o}$ 218, may be determined depending on parameter values such as $J_i$, $r_i$ and $J_o$, $r_o$, respectively. Utilization of time-varying proportional controllers that depend directly on the longitudinal position, or indirectly through tape-transport parameters such as reel moment of inertia and reel radius, may provide transfer functions from the input motor currents to the controlled variables, and from the velocity and tension disturbances to the velocity and tension errors, respectively, that are essentially independent of the tape longitudinal position.

Such a tape transport control system with properly chosen time-varying p-type controllers for the control of tension, tape velocity at the supply reel, and tape velocity at the take-up reel, may exhibit transfer functions from the input reference values to the controlled variables, and from the velocity and tension disturbances to the velocity and tension errors, respectively, that are essentially independent of the tape longitudinal position. This characteristic may be achieved by choosing the inboard and outboard p-type velocity controllers as $$K_{v,i} = g_v \frac{J_i}{R_i K_i}$$

and $$K_{v,0} = g_v \frac{J_0}{R_0 K_0},$$

respectively, and the tension controller as $$K_\tau = g_\tau \frac{1}{\frac{R_i K_i}{J_i} + \frac{R_0 K_0}{J_0}},$$

where $g_v$ and $g_\alpha$ denote constant gains.

Here the tape transport system may be augmented by including a time-varying peak filter cascaded with the p-type controller $K_\tau$, to suppress the disturbance arising from the supply-reel eccentricity in the feedback of tape tension. The transfer function of the peak filter is given by $$K_{var}(s) = \frac{s^2 + 2\zeta_1 \omega_1 + \omega_1^2}{s^2 + 2\zeta_2 \omega_2 + \omega_2^2},$$

where $\zeta_i$ and, $\omega_i$, i=1, 2, represent the damping ratio and the center frequency of the second-order terms at the numerator and denominator of the peak-filter transfer function, respectively. Typically, a peak filter is cascaded with the controller in a servomechanism to suppress narrow-band disturbances, for example, repeatable runout (RRO) and non-repeatable runout (NRRO) disturbances in hard-disk drives (HDDs). The classical choice for a peak filter transfer function is the inverse of a notch filter transfer function, which yields $\omega_1 = \omega_2$ and $\zeta_1 > \zeta_2$. This choice works well, however, if the frequency of the disturbance is within the loop bandwidth, as defined by the −3 dB crossover point of the sensitivity frequency response. If the disturbance frequency is outside the loop bandwidth, a choice of the peak filter based on the inverse of a notch filter may lead to poor disturbance suppression or even to disturbance enhancement. We rely instead on a design of the peak filter based on the minimization of the $H_\infty$ norm of a control system formulation that considers the transfer function of the tape transport system, the velocity and tension errors as well as the control efforts and the velocity and tension output signals. Such a peak filter may have a transfer function defined by the ratio of two second-order polynomials. The tension disturbance $\tau_{dist}$ may be modeled as white noise filtered by a filter $W_\tau$ that exhibits a low-pass characteristic with an additional peak at the disturbance frequency.

Figure 2B:
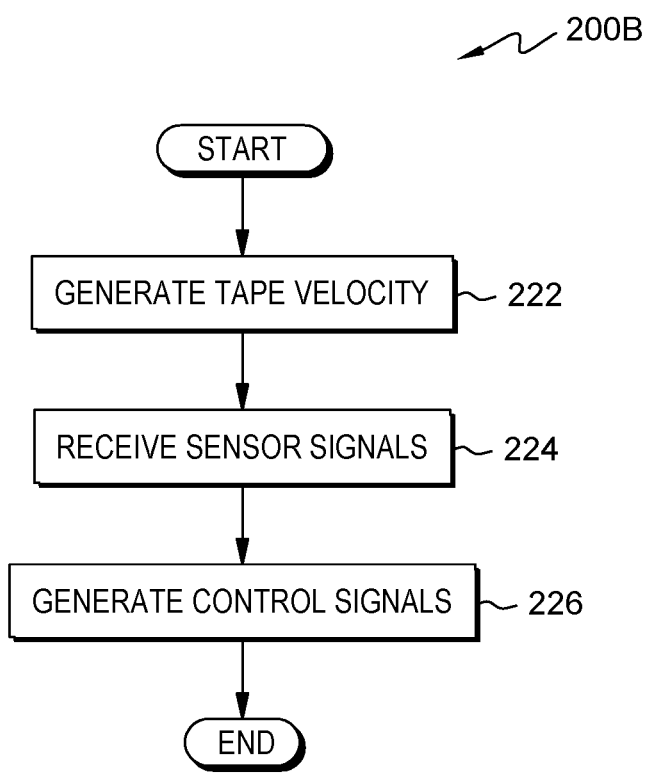
FIG. 2B is a flowchart depicting operational steps of a tape transport mechanism and track-following control systems in accordance with FIG. 1.

FIG. 2B is a flowchart depicting operational steps of a tape transport mechanism and track-following control systems in accordance with FIG. 1.

Tape transport control 118 generates tape velocity signal and tape tension signal (step 222). In an embodiment, a tape media is transported across the tape drive via reel 102 and reel 104. During read or write operation of the tape media, dual-servo channel 110 can generate data signals to indicate tape velocity. In addition, tension sensor 124 can generate tape tension 125 signal during tape transport operation.

Tape transport control 118 receives sensor signals (step 224). In an embodiment, tape transport control 118 receives a plurality of data from various sensors within the tape transport mechanism and track-following control systems. For example, tape transport control 118 receives data from Hall-effect sensors 120, 122 in order to determine secondary tape velocity from individual reels.

Tape transport control 118 generates control signals (step 226). In an embodiment, after analyzing the received signals from various sensors, tape transport control system 118 can control tape speed via motor 1 and motor 2. For example, after receiving data from sensor signals such as tape velocity, head position, and LPOS 116 and tape transport control 118 can generate control signals output to motor control circuitry, such as motor 1 control 126 and motor 2 control 128.

Figure 3:
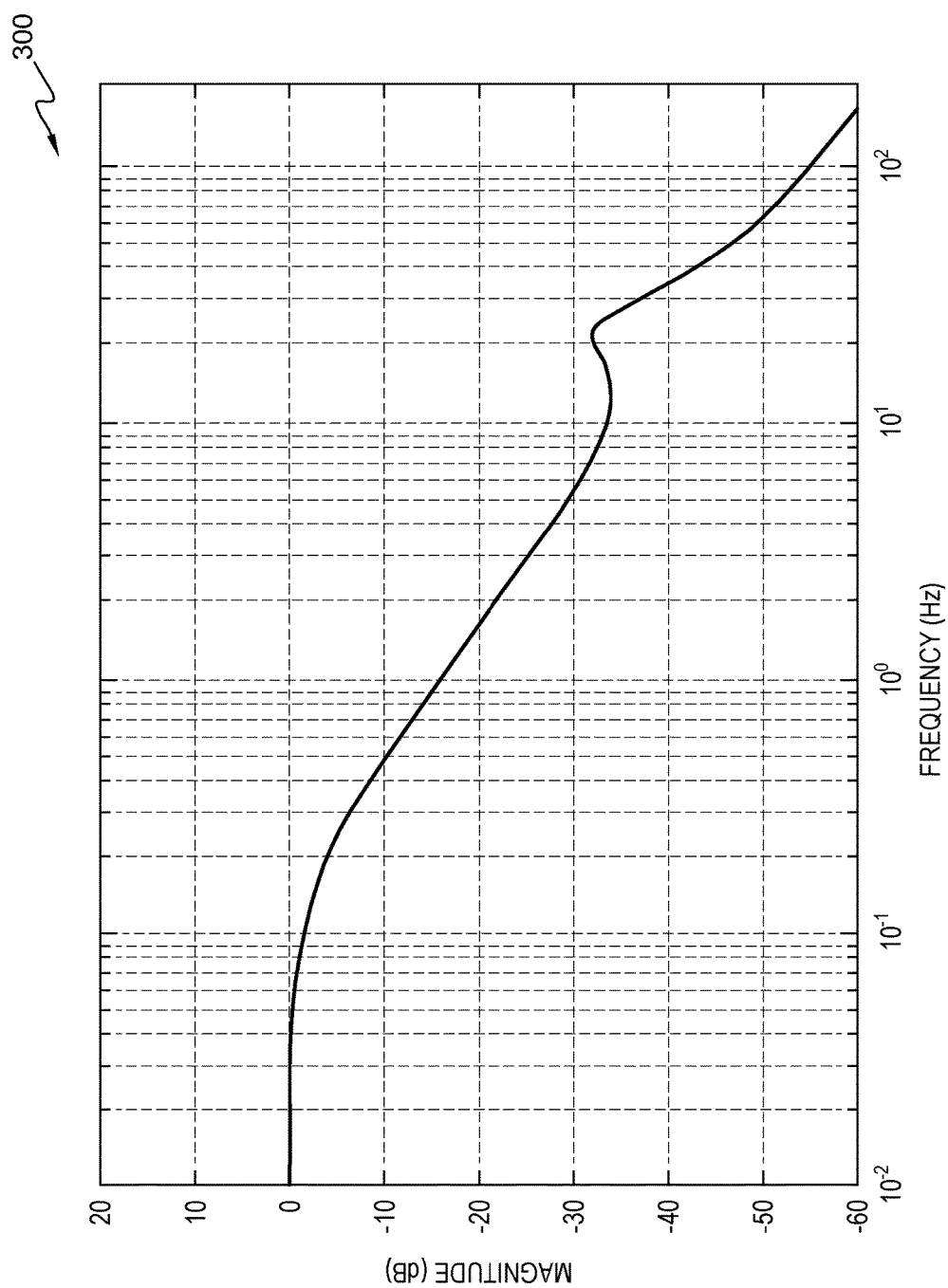
FIG. 3 is an exemplary diagram of a frequency characteristic of a weighting filter.

FIG. 3 shows the frequency characteristic 300 of the weighting filter $W_\tau$ near the end of tape, i.e., for a longitudinal position of 710 m. The denominator of the peak filter transfer function may be obtained by choosing the time-varying center frequency, such as $$\omega_2 = \frac{v}{R_2}$$

and a constant damping ratio, such as $\zeta_2 = 0.027$, whereas the center frequency $\omega_1$ and damping ratio $\zeta_1$ at the numerator are obtained by the $H_\infty$-norm minimization at a given number of equally spaced tape longitudinal positions.

Figure 4:
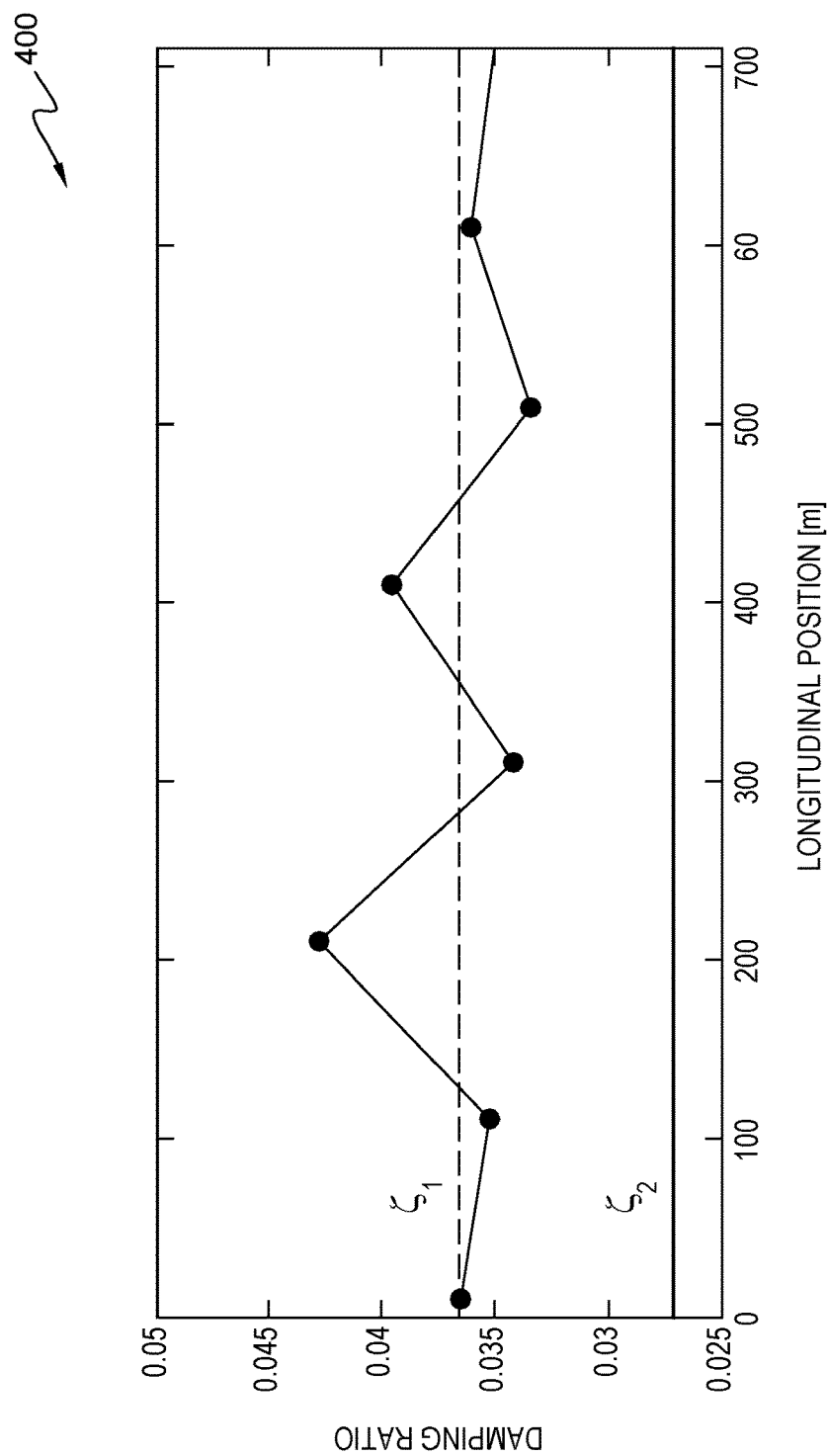
FIG. 4 is an exemplary diagram of the damping ratios of the numerator and denominator of an $H_\infty$ peak filter.
Figure 5:
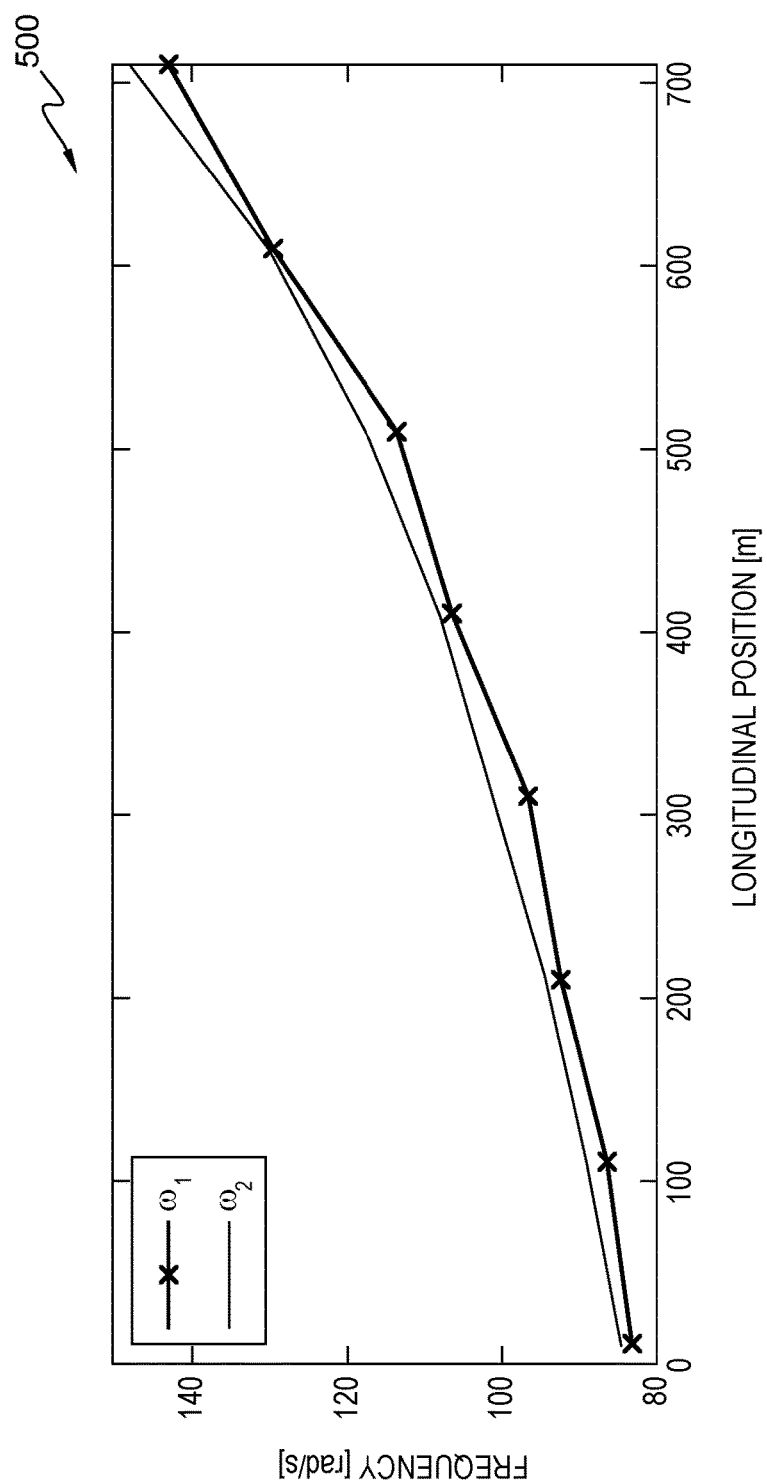
FIG. 5 is an exemplary diagram of the center frequency of the numerator and the denominator of an $H_\infty$ peak filter.

FIGS. 4 and 5 show the damping ratios and the center frequencies, respectively, of the second-order terms of the $H_\infty$ peak-filter transfer function vs. tape longitudinal position, respectively. For a tape system having tape spring constant $K_T = 170$ N/m, damper coefficient $D_T = 0.1$ N s/m, the reel radius varying in the range [0.022 m-0.047 m], the reel inertia varying in the range [$7 \times 10^{-5}$ Kg m$^2$-$1.9 \times 10^{-4}$ Kg m$^2$], and transducer gains equal to 0.02 N m/A, FIG. 4 shows examples of the damping ratios of the second-order terms of the $H_\infty$ peak-filter transfer function vs. tape longitudinal position. FIG. 5 shows examples of center frequencies of the second-order terms of the $H_\infty$ peak-filter transfer function vs. tape longitudinal position. As mentioned above, it is important to devise a tension control method that does not require the insertion of costly tension sensors in the tape path. In an embodiment, a tension control technique may utilize the difference of the lateral position estimates from the two servo channels to obtain an estimate of the tension to feed back. Using the known geometry of the tape layout and Hooke's law, which relates stress and strain tensors in elastic materials, an estimate of the tension variation $\Delta T$ is given by $$\Delta T \approx -\frac{4\varepsilon E}{\upsilon}(y_{ch1} - y_{ch0}),$$

where $y_{ch1}$ and $y_{ch0}$ are the lateral position estimates from the two servo channels, $\varepsilon$ denotes the tape thickness, and E and $\upsilon$ are the Young's modulus and the Poisson's ratio of the tape medium, respectively. The expression provides an estimate of the dynamic tension variation, but does not allow compensation for tension variations at very low frequencies close to dc, because of the very slowly varying deviation of the distance between servo bands from the nominal value due to creep and temperature and humidity variations. To circumvent this phenomenon, a high-pass section of the type s/(s+a) may be included in the transfer function of $K_{var}(s)$, and feedforward time-varying filters $K_{ff,i}$ and $K_{ff,o}$ may be included to adjust the dc tension value, as illustrated in FIG. 2.

Figure 6:
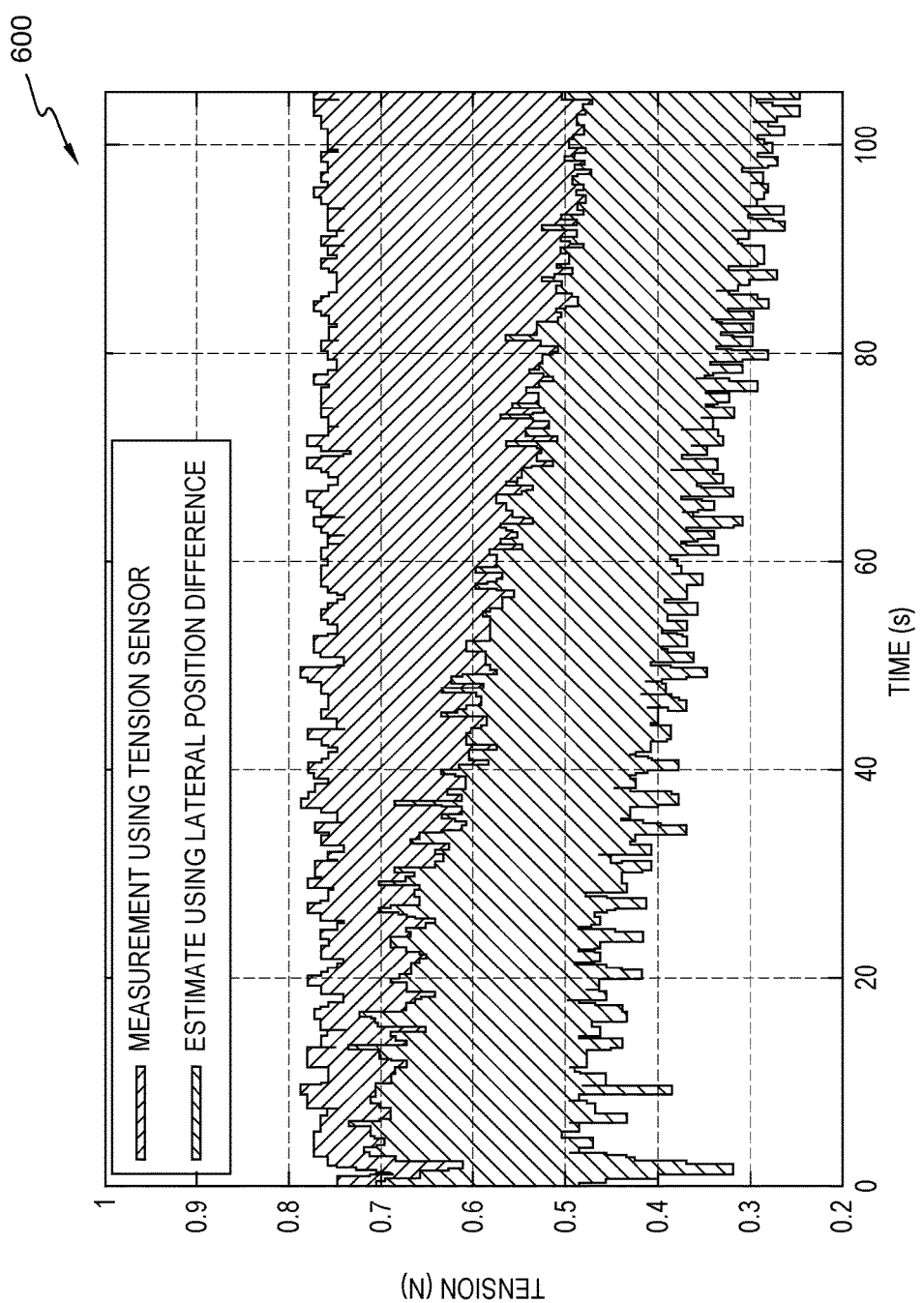
FIG. 6 is an exemplary diagram of a comparison of a tension measurement for experimental waveforms of the tension measured using the tension sensor with the tension estimate obtained by the lateral position difference.
Figure 7:
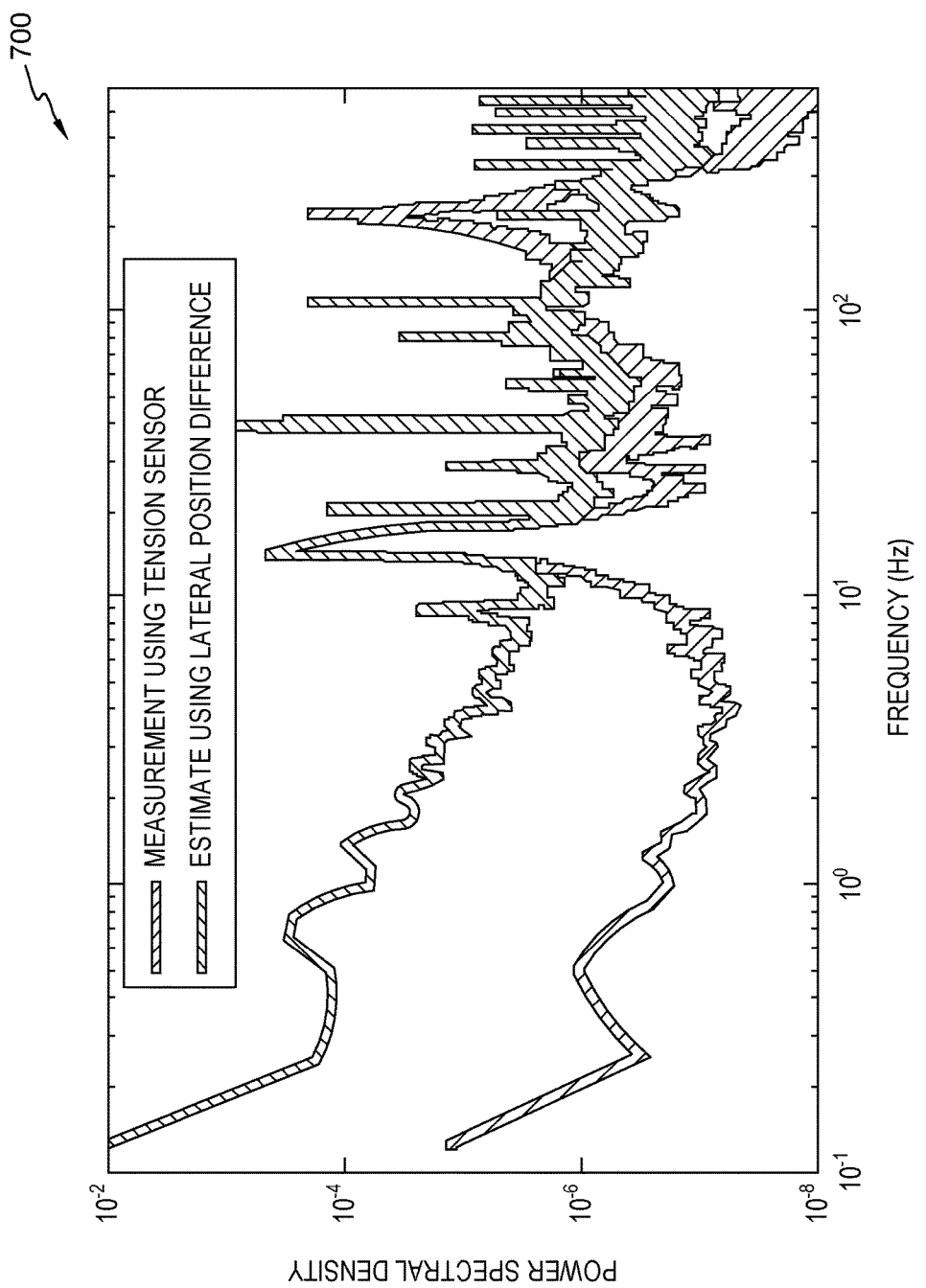
FIG. 7 is an exemplary diagram of a comparison of a power spectral density for experimental waveforms of the tension measured using the tension sensor with the tension estimate obtained by the lateral position difference.

The performance improvements of embodiments of the tape transport servomechanism may be demonstrated using an experimental tape path. The tape path consists of the machine and file reels and four flangeless roller elements, as is shown in FIG. 1. Tape tension may be obtained from two strain gauges mounted on two of the rollers as well as using the difference of two lateral position estimates as described above. FIGS. 6 and 7 compare the experimental waveforms of the tension measured using the tension sensor with the tension estimate obtained by the lateral position difference. As shown in the figures, the estimate obtained by the lateral position difference shows a strong low frequency component that is not present at the measurement obtained by the tension sensor. This low frequency characteristic is not related to tension variations but is mainly due to creep and tape pack stress. Besides the low frequency region, both measurements capture very well the main tension disturbance that appears as a broad peak at frequencies of 10-20 Hz. This tension disturbance is arising from the supply reel eccentricity and its spectral component increase with time as the supply reel radius decreases. Finally, the peak at the frequency of 200 Hz that appears at the measurement obtained by the tension sensor is an effect of the sensor resonance and it is not related to a measurement of the tape tension.

Figure 8:
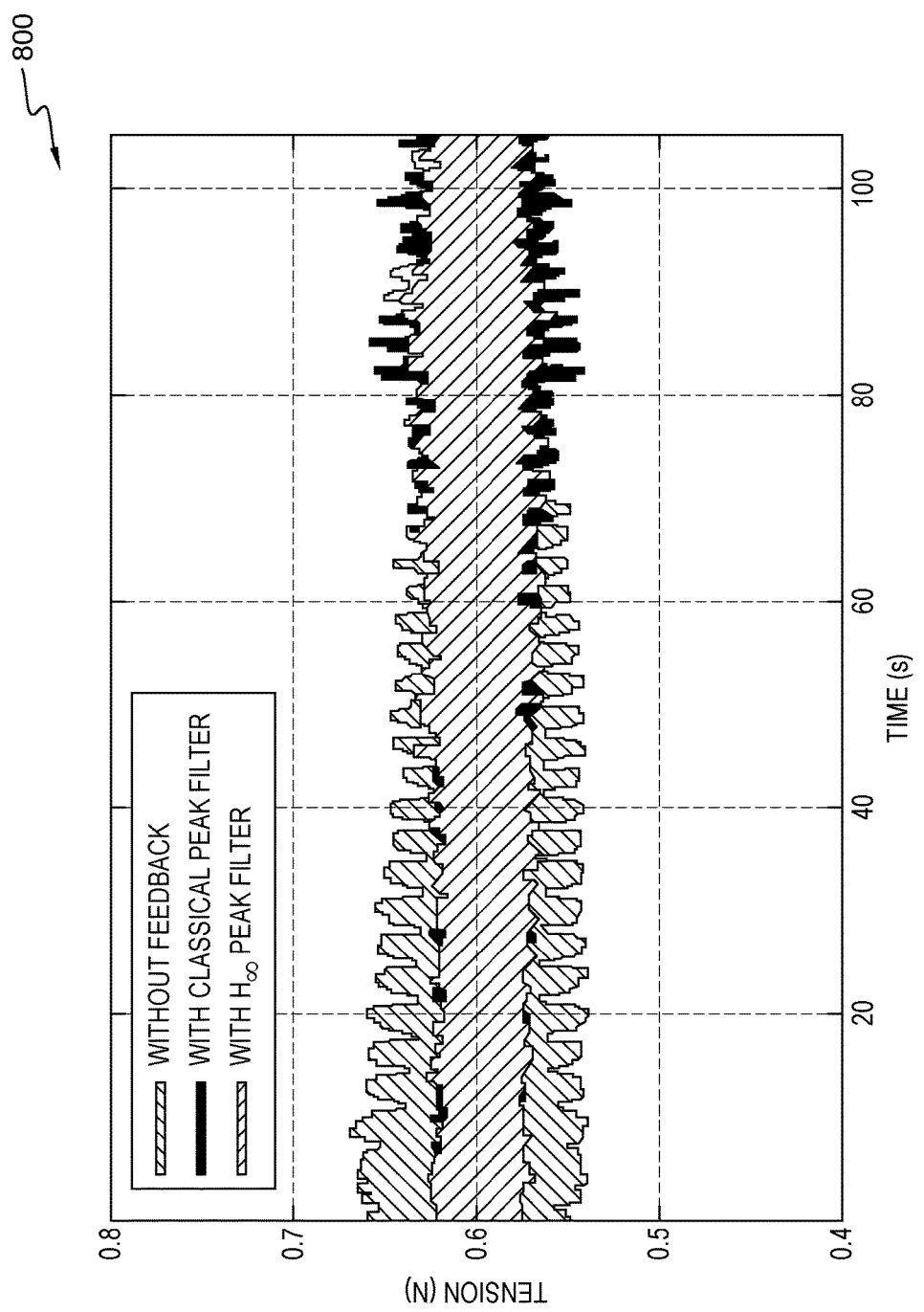
FIG. 8 is an exemplary diagram of a comparison of a tension measurement for three control system configurations, namely a) without tension feedback, b) with a feedback controller augmented by a time-varying peak filter designed using the classical approach and c) with a feedback controller augmented by a time-varying filter with parameters optimized using the $H_\infty$ methodology.
Figure 9:
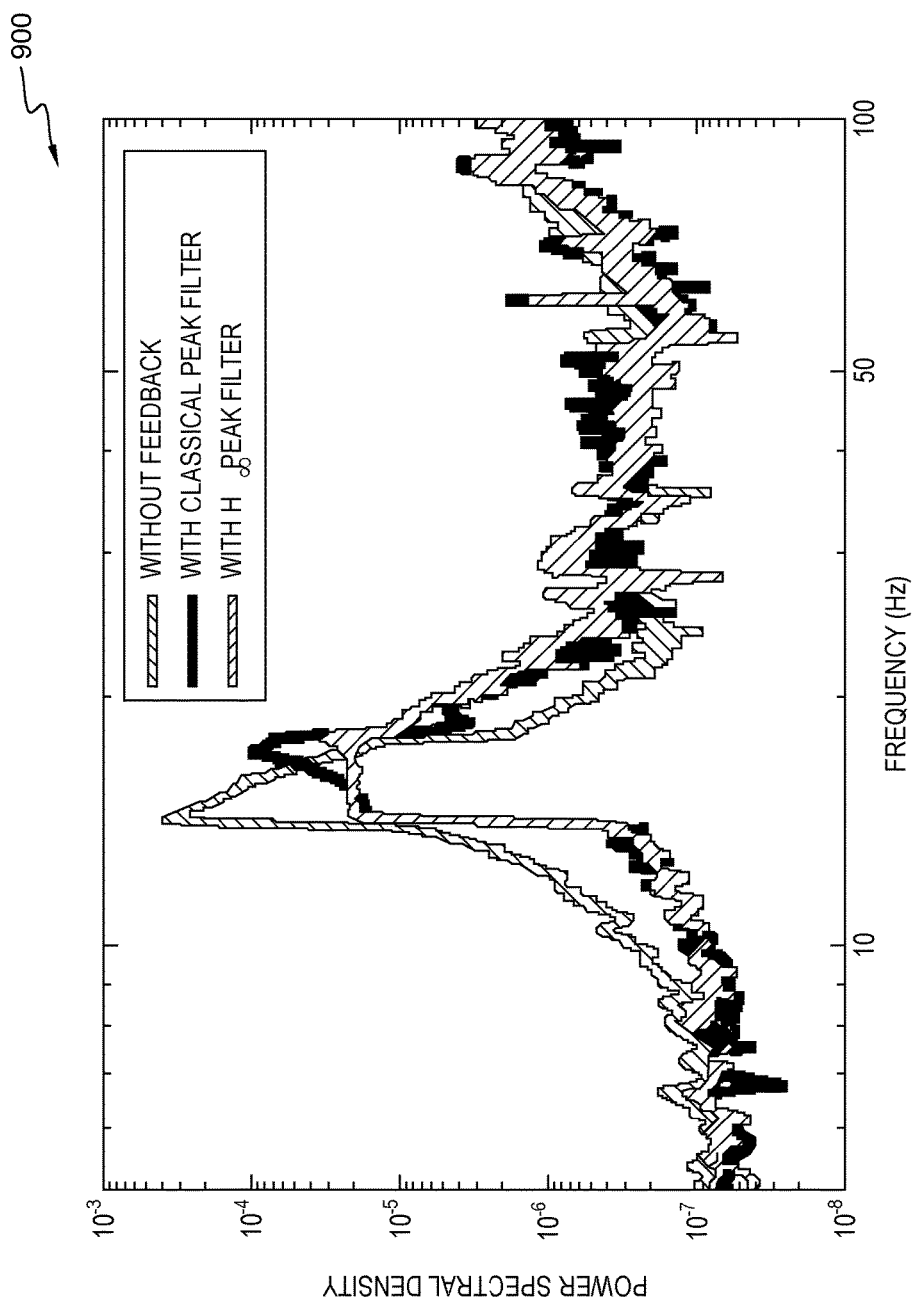
FIG. 9 is an exemplary diagram of a comparison of a power spectral density for three control system configurations, namely a) without tension feedback, b) with a feedback controller augmented by a time-varying peak filter designed using the classical approach and c) with a feedback controller augmented by a time-varying filter with parameters optimized using the $H_\infty$ methodology.

The tape transport servomechanisms described above were implemented in the experimental tape transport and measurements from the tension sensor were used to evaluate the performance of the closed-loop system. FIGS. 8 and 9 show a comparison of the tension measurement for the three control system configurations, namely a) without tension feedback, b) with a feedback controller augmented by a time-varying peak filter designed using the classical approach and c) with a feedback controller augmented by a time-varying filter with parameters optimized using the $H_\infty$ methodology. Both feedback control schemes show improved performance at the frequency of the main supply reel disturbance compared to the tape transport without feedback. However, as the disturbance frequency increases with time while tape is moving from beginning of tape to end of tape, the tape transport system with the classical peak filter exhibits tension disturbance enhancement. This issue is mitigated with the tape transport servomechanism that includes the $H_\infty$-optimized peak filter. In terms of tension standard deviation, the performance improves from 0.022 N for the case without feedback to 0.014 N and 0.011 N for the feedback control with the classical and the $H_\infty$ peak filter, respectively.

Figure 10:
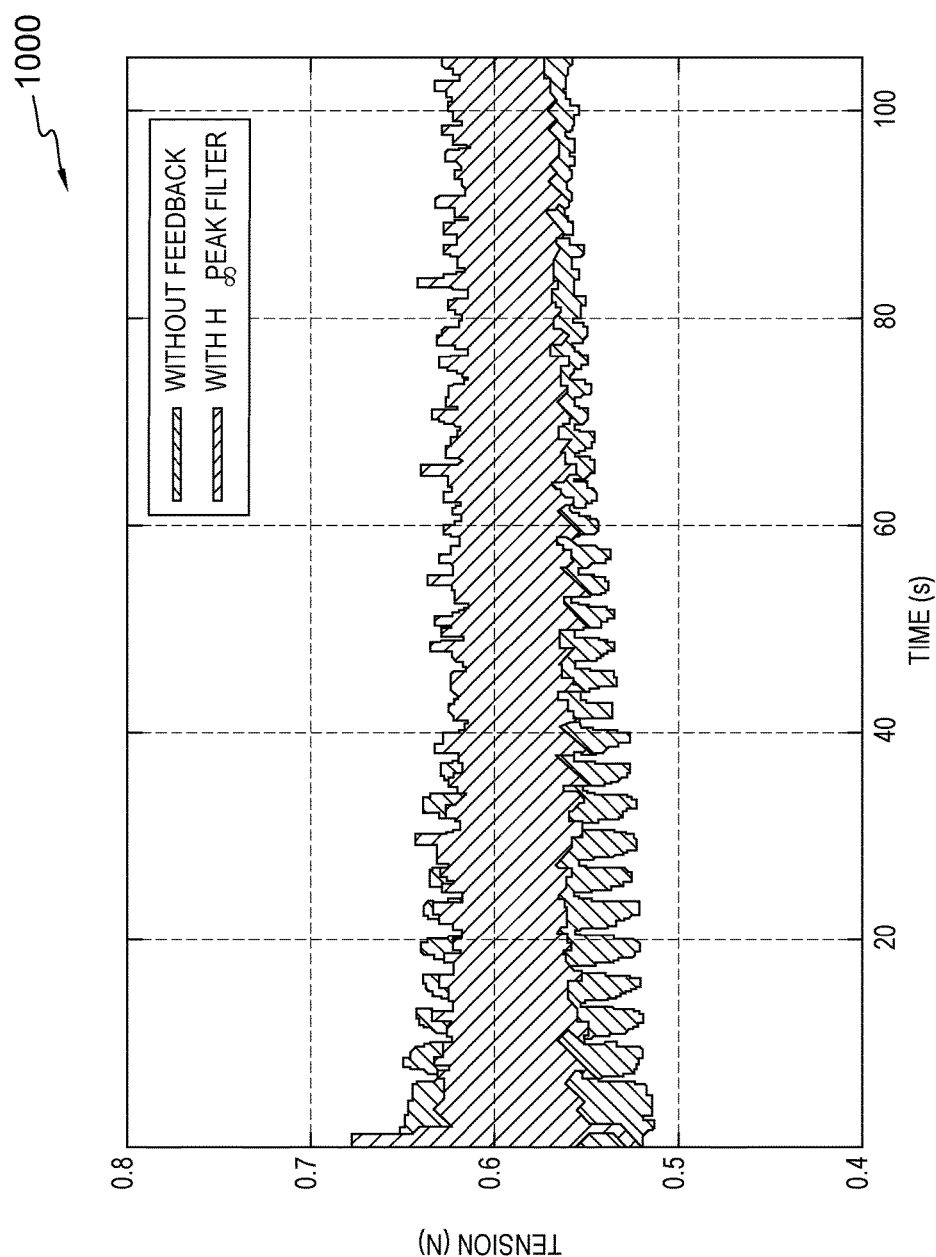
FIG. 10 is an exemplary diagram of a comparison of a tension measurement for the case without tension feedback and with a feedback controller augmented by the $H_\infty$-optimized peak filter and using the tension estimated by the lateral position difference.
Figure 11:
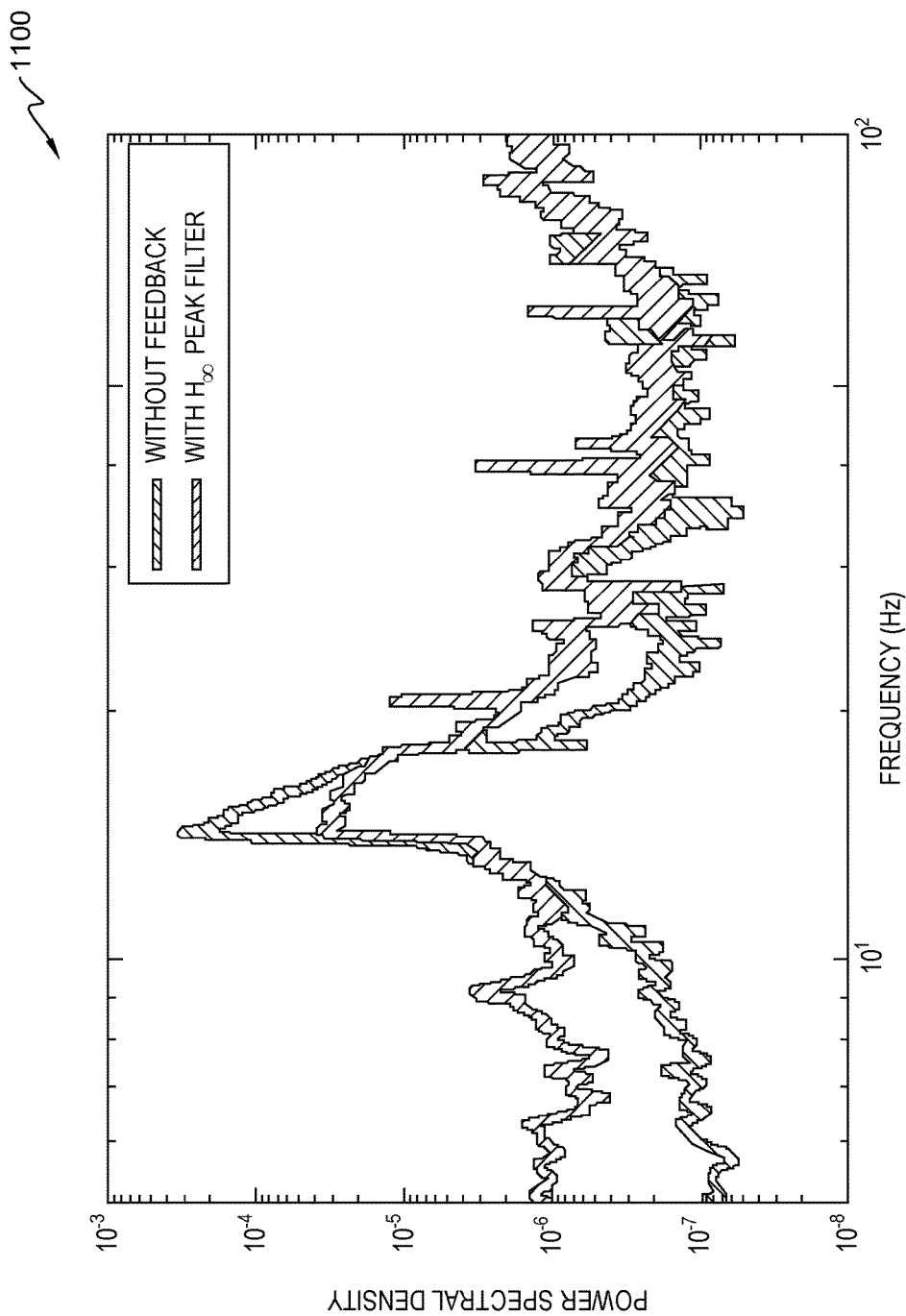
FIG. 11 is an exemplary diagram of a comparison of a power spectral density for the case without tension feedback and with a feedback controller augmented by the $H_\infty$-optimized peak filter and using the tension estimated by the lateral position difference.

Finally, the tension control technique that relies on the difference of the lateral position estimates was used for the tension feedback. In this case, as described in the previous section a high pass filter was included in the controller to avoid correction of the low-frequency effects due to creep. FIG. 10 shows a comparison of the tension measurement for the case without tension feedback and with a feedback controller augmented by the $H_\infty$-optimized peak filter. FIG. 11 shows a comparison of the power spectral density for the case without tension feedback and with a feedback controller augmented by the $H_\infty$-optimized peak filter. The tension feedback in this case is based on the difference of the lateral position estimates. The experimental results demonstrate that the tape transport performance is improved at the frequency of the main supply reel disturbance. In terms of tension standard deviation, the performance improves from 0.022 N for the case without feedback to 0.013 N for the feedback control with the tension estimate. Accordingly, it is feasible to improve the tension performance without requiring additional sensors in the tape path for the tension measurement.

Figure 12:
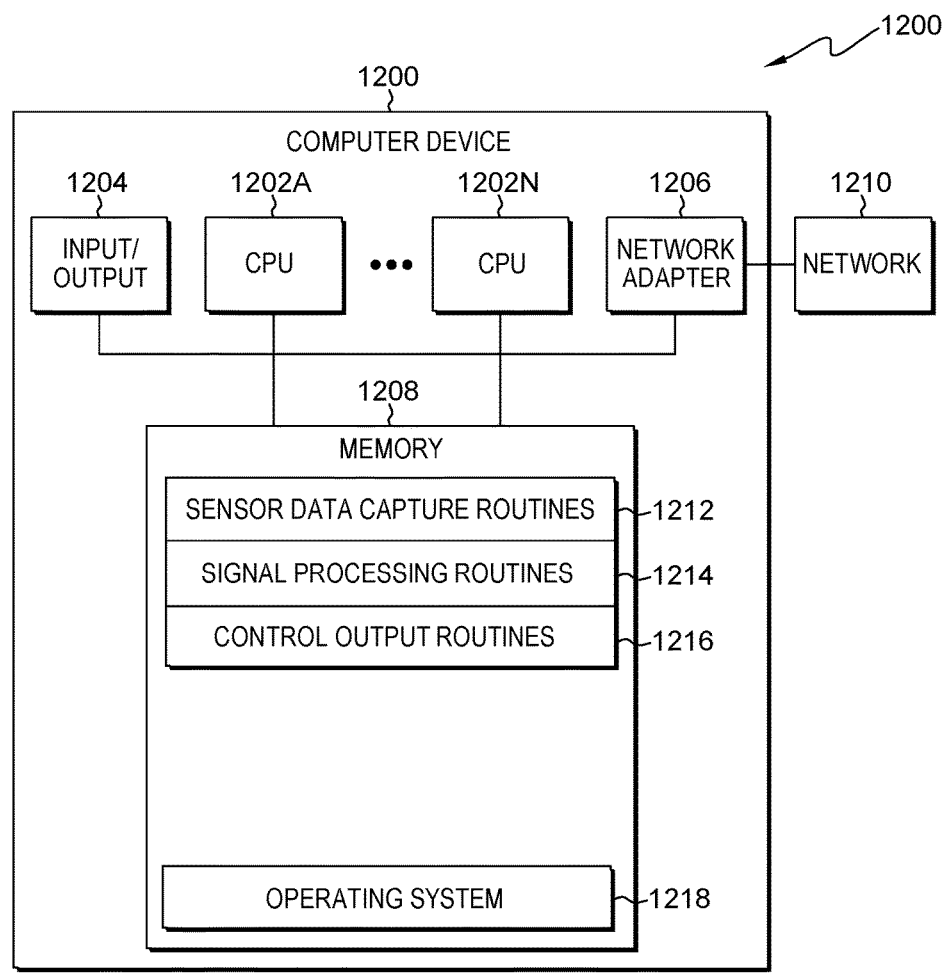
FIG. 12 is an exemplary block diagram of a computer system in which processes involved in the embodiments described herein may be implemented.

An exemplary block diagram of a computing device 1200, in which processes involved in the embodiments described herein may be implemented, is shown in FIG. 12. Computing device 1200 may be a programmed general-purpose computer system, such as an embedded processor, system on a chip, personal computer, workstation, server system, and minicomputer or mainframe computer, or system 1200 may be included in a special purpose processing device, such as a field-programmable gate array (FPGA), custom or semi-custom application specific integrated circuit (ASIC), or other processing device. Computing device 1200 may include one or more processors (CPUs) 1202A-1202N, input/output circuitry 1204, network adapter 1206, and memory 1208. CPUs 1202A-1202N execute program instructions in order to carry out the functions of the present invention. FIG. 12 illustrates an embodiment in which computing device 1200 is implemented as a single multiprocessor system, in which multiple processors 1202A-1202N share system resources, such as memory 1208, input/output circuitry 1204, and network adapter 1206. However, the present invention also contemplates embodiments in which computing device 1200 is implemented in other configurations.

Input/output circuitry 1204 provides the capability to input data to, or output data from, computing device 1200. For example, input/output circuitry may include input devices, such as keyboards, mice, touchpads, trackballs, scanners, analog to digital converters, etc., output devices, such as video adapters, monitors, printers, digital to analog converters, etc., and input/output devices, such as, modems, etc. Network adapter 1206 interfaces device 1200 with a network 1210. Network 1210 may be any public or proprietary LAN or WAN, including, but not limited to the Internet.

Memory 1208 stores program instructions that are executed by, and data that are used and processed by, CPU 1202 to perform the functions of computing device 1200. Memory 1208 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1208 may vary depending upon the function that computing device 1200 is programmed to perform. In the example shown in FIG. 12, exemplary memory contents are shown representing routines and data for embodiments of the processes described above, such as processes that may be performed by tape transport control 118, shown in FIG. 1. However, one of skill in the art would recognize that these routines, along with the memory contents related to those routines, may not be included on one system or device, but rather may be distributed among a plurality of systems or devices, based on well-known engineering considerations. The present invention contemplates any and all such arrangements.

In the example shown in FIG. 12, memory 1208 may include sensor data capture routines 1212, signal processing routines 1214, control output routines 1216, and operating system 1218. For example, sensor data capture routines cell data 1212 may include routines that interact with one or more sensors, such as Hall sensors 120, 122, and one or more tension sensors 124, shown in FIG. 1. Signal processing routines 1214 may include routines to process the received signal data in order to control operation of a tape drive system 100, shown in FIG. 1. Control output routines 1216 may include routines to generate and output control signals, such as control signals for motor 1 control 126, and motor 2 control 128, shown in FIG. 1. Operating system 1218 provides overall system functionality.

As shown in FIG. 12, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A closed-loop control system for controlling a tape transport from a first tape reel having a first reel motor to a second tape reel having a second reel motor in a tape drive system, comprising:
    circuitry adapted to output one or more signals representing a tape velocity, at least one radius of either the first tape reel or the second tape reel, and a tape tension; and
    control circuitry adapted to receive the one or more signals representing the tape velocity, the at least one radius of either the first tape reel or the second tape reel, and the tape tension, and based on the received signals, generate at least one control signal to control at least one of the first reel motor or the second reel motor so as to reduce a tension disturbance at at least one frequency corresponding to a time-varying reel-rotation frequency, based on controller parameters that depend on the tape velocity and on the at least one radius of either the first tape reel or the second tape reel and wherein the control circuitry is further configured to reduce a tension disturbance based on a peak filter with a transfer function defined by the ratio of two second-order polynomials.

2. The system of claim 1, wherein the circuitry adapted to output a signal representing the tape tension comprises:
    two servo channels adapted to receive signals from two servo readers that are positioned on a tape head and are configured to output signals read from adjacent servo bands on the tape;
    circuitry adapted to determine a lateral position estimate for each of the two servo channels based on the signals output from the two servo readers; and
    circuitry adapted to determine the tape tension based on a difference between the lateral position estimates from the two servo channels.

3. The system of claim 2, wherein the tape tension determined based on a difference between the lateral position estimates from the two servo channels comprises:

$$\Delta T \approx -\frac{4\varepsilon E}{\upsilon}(y_{ch1} - y_{ch0}),$$

wherein $y_{ch1}$ and $y_{ch0}$ are the lateral position estimates from the two adjacent servo channels, $\varepsilon$ is the tape thickness, and E is the Young's modulus of a tape medium, and $\upsilon$ is the Poisson's ratio of the tape medium.

4. The system of claim 1, wherein a center frequency and a damping ratio of the numerator of the peak filter are based on an $H_\infty$-norm minimization of a control system formulation at a number of equally spaced tape longitudinal positions and the denominator of the peak filter is based on a selected time-varying center frequency and a constant damping ratio.

5. The system of claim 1, wherein the control circuitry is further configured to reduce a tension disturbance based on a peak filter with a transfer function based on a minimization of an $H_\infty$ norm of a control system formulation that is based on the transfer function of the tape transport system, on errors in the tape velocity, errors in the tape tension, and on the output control signal.

6. A tape transport system, comprising:
    a first tape reel having a first reel motor, a second tape reel having a second reel motor, and a tape head;
    circuitry adapted to output one or more signals representing a tape velocity, at least one radius of either the first tape reel or the second tape reel, and a tape tension; and
    control circuitry adapted to receive the one or more signals representing the tape velocity, the at least one radius of either the first tape reel or the second tape reel, and the tape tension, and based on the received signals, generate at least one control signal to control at least one of the first reel motor or the second reel motor so as to reduce a tension disturbance at at least one frequency corresponding to a time-varying reel-rotation frequency, based on controller parameters that depend on the tape velocity and on the at least one radius of either the first tape reel or the second tape reel and wherein the control circuitry is further configured to reduce a tension disturbance based on a peak filter with a transfer function defined by the ratio of two second-order polynomials.

7. The system of claim 6, wherein the circuitry adapted to output a signal representing the tape tension comprises:

two servo channels adapted to receive signals from two servo readers that are positioned on a tape head and are configured to output signals read from adjacent servo bands on the tape;

circuitry adapted to determine a lateral position estimate for each of the two servo channels based on the signals output from the two servo readers; and circuitry adapted to determine the tape tension based on a difference between the lateral position estimates from the two servo channels.

8. The system of claim 7, wherein the tape tension determined based on a difference between the lateral position estimates from the two servo channels comprises:

$$\Delta T \approx -\frac{4\varepsilon E}{v}(y_{ch1} - y_{ch0}),$$

wherein $y_{ch1}$ and $y_{ch0}$ are the lateral position estimates from the two adjacent servo channels, $\varepsilon$ is the tape thickness, and E is the Young's modulus of a tape medium, and $\upsilon$ is the Poisson's ratio of the tape medium.

9. The system of claim 6, wherein a center frequency and a damping ratio of the numerator of the peak filter are based on an $H_\infty$-norm minimization of a control system formulation at a number of equally spaced tape longitudinal positions and the denominator of the peak filter is based on a selected time-varying center frequency and a constant damping ratio.

10. The system of claim 6, wherein the control circuitry is further configured to reduce a tension disturbance based on a peak filter with a transfer function based on a minimization of an $H_\infty$ norm of a control system formulation that is based on the transfer function of the tape transport system, on errors in the tape velocity, errors in the tape tension, and on the output control signal.

11. In a tape transport system, a method comprising:
generating one or more signals representing a tape velocity, at least one radius of either a first tape reel or a second tape reel, and a tape tension;

receiving the one or more signals representing the tape velocity, the at least one radius of either the first tape reel or the second tape reel, and the tape tension;

based on the received signals, generating at least one control signal to control at least one of the first reel motor or the second reel motor so as to reduce a tension disturbance at at least one frequency corresponding to a time-varying reel-rotation frequency, based on controller parameters that depend on the tape velocity and on the at least one radius of either the first tape reel or the second tape reel; and reducing a tension disturbance based on a peak filter with a transfer function defined by the ratio of two second-order polynomials.

12. The method of claim 11, wherein generating a signal representing the tape tension comprises:
receiving signals from two servo channels that receive signals from two servo readers that that are positioned on a tape head and are configured to output signals read from adjacent servo bands on the tape;

determining a lateral position estimate for each of the two servo readers based on the received signals; and determining the tape tension based on a difference between the lateral position estimates from the two servo channels.

13. The method of claim 12, wherein the tape tension determined based on a difference between the lateral position estimates from the two servo channels comprises:

$$\Delta T \approx -\frac{4\varepsilon E}{v}(y_{ch1} - y_{ch0}),$$

wherein $y_{ch1}$ and $y_{ch0}$ are the lateral position estimates from the two adjacent servo channels, $\varepsilon$ is the tape thickness, and E is the Young's modulus of a tape medium, and $\upsilon$ a is the Poisson's ratio of the tape medium.

14. The method of claim 11, wherein a center frequency and a damping ratio of the numerator of the peak filter are based on an $H_\infty$-minimization of a control system formulation at a number of equally spaced tape longitudinal positions and the denominator of the peak filter is based on a selected time-varying center frequency and a constant damping ratio.

15. The method of claim 11, wherein the control circuitry is further configured to reduce a tension disturbance based on a peak filter with a transfer function based on a minimization of an $H_\infty$ norm of a control system formulation that is based on the transfer function of the tape transport system, on errors in the tape velocity, errors in the tape tension, and on the output control signal.

* * * * *